No. 850,300. PATENTED APR. 16, 1907.
F. EDER.
VEHICLE.
APPLICATION FILED NOV. 7, 1906.
2 SHEETS—SHEET 1.
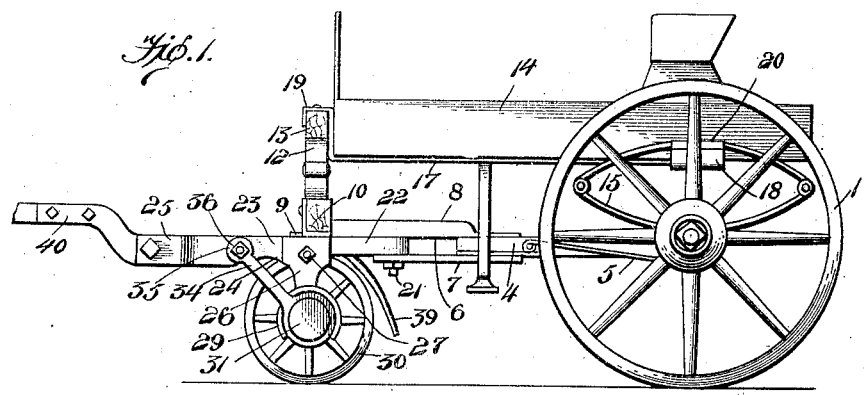
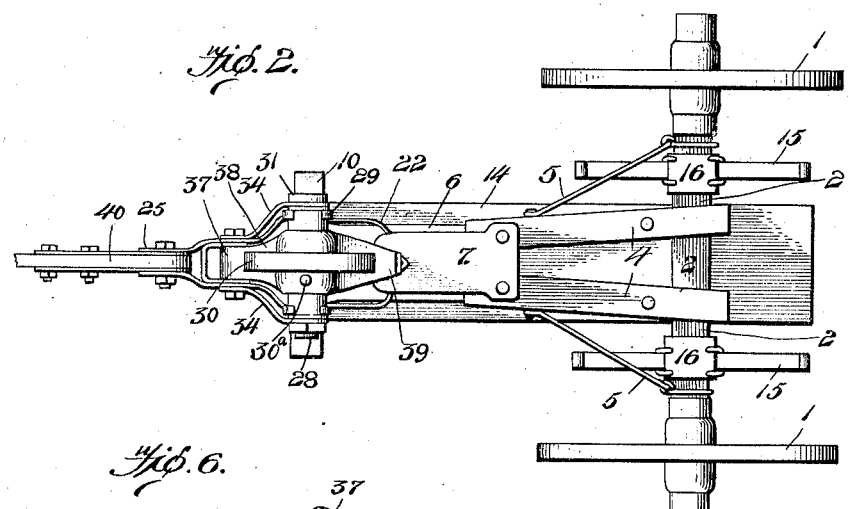
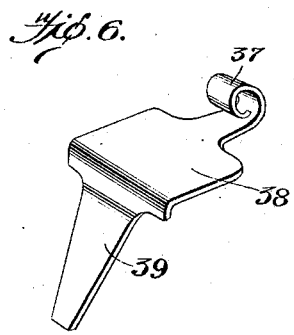
Inventor
Frank Eder.
Witnesses
B. M. Offutt
G. M. Spring.
By David P. Moore.
Attorney No. 850,300. PATENTED APR. 16, 1907.
F. EDER.
VEHICLE.
APPLICATION FILED NOV. 7, 1906.
2 SHEETS—SHEET 2.
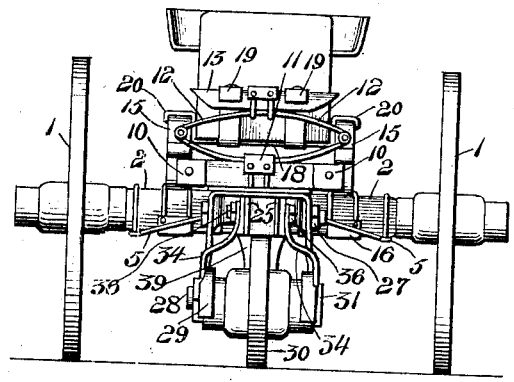
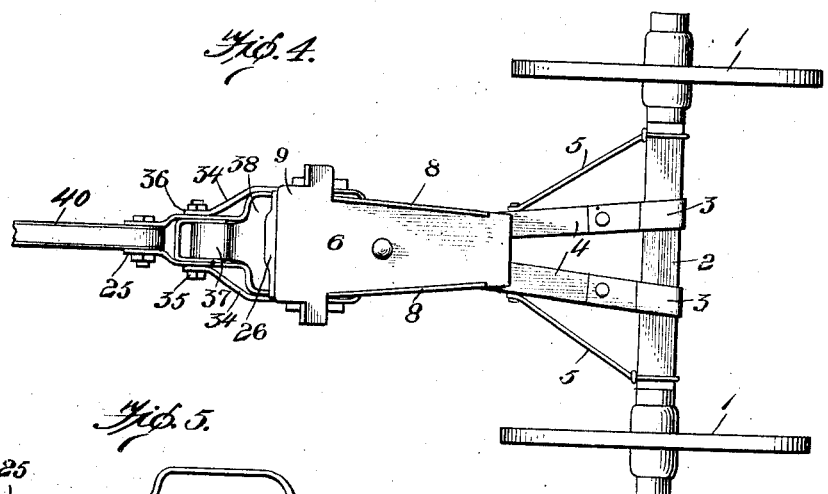
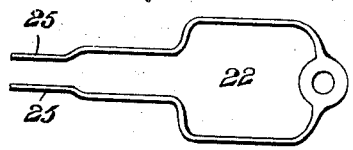
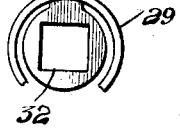
Witnesses
B. M. Offutt
G. M. Spring
Inventor
Frank Eder.
By
David S. Moore
Attorney

UNITED STATES PATENT OFFICE.

FRANK EDER, OF THAYER, MISSOURI.

VEHICLE.

No. 850,300.  Specification of Letters Patent.  Patented April 16, 1907.

Application filed November 7, 1906. Serial No. 342,364.

*To all whom it may concern:*

Be it known that I, FRANK EDER, a citizen of the United States, residing at Thayer, in the county of Oregon and State of Missouri, have invented certain new and useful Improvements in Vehicles, of which the following is a specification, reference being had therein to the accompanying drawings.

My invention relates to improvements in vehicles, and has special reference to an improved construction of buggy in which the body is suitably mounted upon three instead of four wheels, a peculiar construction of running-gear, fifth-wheel, and general construction being employed, by which the buggy is made thoroughly efficient and very practical.

To attain this end, my invention consists of a buggy embodying novel features of construction and combination of parts, substantially as disclosed herein.

In the accompanying drawings, Figure 1 is a side elevation of a buggy made according to and embodying my invention. Fig. 2 is a bottom plan view thereof. Fig. 3 is a front elevation. Fig. 4 is a top plan view with the body removed. Fig. 5 is an enlarged detail view of the fifth-wheel. Figs. 6, 7, and 8 are detail views of various parts.

Referring to the drawings, the numeral 1 designates the rear wheels, which are mounted upon the ends of the rear axle 2, which has secured thereto, by means of the straps 3, the forwardly-projecting arms or supports 4, which form a portion of the running-gear. Connected to these arms and also to the axle are the two brace-rods 5, while connected to their forward ends, so as to connect said ends together, are the upper plate or fifth-wheel support 6 and the lower plate or fifth-wheel support 7, which is shorter than the upper plate 6. The upper plate 6 is provided with the side flanges 8 and the forward flat end 9, which is bolted or otherwise connected to the transverse strip 10, to which is secured by clamps 11 the spring 12, which is suitably connected to the forward end of the supports 13, carrying the body 14, whose rear end is suitably supported upon the two springs 15, secured by clamps 16 to the axle 2. The body is preferably mounted upon the two longitudinal strips 17 and the one transverse strip 18, the former of which extends practically the full length of the bottom of the body and is provided with the hooked ends 19, by means of which the strips are secured to the forward spring 12, while the latter strip 18 is secured to the strips 17 near their rear ends and has its angled terminals 20 suitably secured to the rear springs 15.

The two fifth-wheel supports 6 and 7 are provided with alining openings in which is mounted the bolt 21, by means of which the fifth-wheel 22, carried by the yoked frame 23, is mounted, so as to allow the yoked frame the proper movement. This yoked frame is provided with the eyed projections 24 and the inwardly-bent terminals 25, the purposes of which will presently appear. Straddling the yoked frame above and in line with the projections 24 is a wheel-supporting yoke 26, which is provided with openings alining with the eyes of the projections 24, the two yokes being secured together by the bolts 27, which pass through said openings and eyes. In the terminals or ends of the yoke 26 is mounted the axle 28, the said terminals also carrying the curved dust-caps 29, which fit over the ends of the wheel 30, which is mounted upon the axle 28. This wheel has provided in its hub an oil-cup 30$^a$.

In order to prevent the axle from revolving with the wheel, I shoulder the headed end 31 thereof and provide the square openings 32 and 33, respectively, in one terminal of the yoke 26 and the brace-arms 34, their forward ends 35 being connected to the terminals 25 by means of a bolt 36, which also supports the forward reduced end 37 of the mud-guard support 38, which carries the front-wheel mud-guard 39. Pivotally connected to the forward ends of the terminals 25 is the shaft or pole coupling 40, which may be of any desired shape or size.

From the foregoing description, taken in connection with the drawings, it is evident that I provide a buggy which is mounted upon three wheels, the forward wheel of which is less than one-half the diameter of the rear wheels and is not dished, as are the rear wheels, and which is thoroughly efficient and practical, thus producing a much simpler and more useful buggy than one equipped with four wheels.

What I claim as new, and desire to secure by Letters Patent, is—

1. In a buggy having a rear axle having two wheels, and a running-gear, of a frame pivotally connected to the forward end of the gear, a wheel-supporting yoke straddling and connected to said frame, a front wheel journaled in said yoke, braces connected to the yoke and the forward end of the frame, and means whereby a draft device is connected to the forward end of the frame.

2. In a buggy, the combination of a body, longitudinal strips secured to the bottom and extending nearly the full length thereof, said strips being provided with hooked forward ends, a transverse strip also carried by the bottom of the body and having angled terminals, a running-gear, a forward spring carried by the running-gear and connected to the hooked ends of the longitudinal strip, rear springs connected to the angled terminals of the transverse strip, a frame pivotally connected to the forward end of the running-gear, a wheel-supporting yoke straddling and connected to said frame, a front wheel journaled in said yoke, means whereby a draft device is connected to the forward end of the frame, and a pair of rear wheels carried by the running-gear.

3. In a buggy, the combination of a body, longitudinal strips secured to the bottom and extending nearly the full length thereof, said strips being provided with hooked forward ends, a transverse strip also carried by the bottom of the body having angled terminals, a running-gear, a forward spring carried by the running-gear and connected to the hooked ends of the longitudinal strips, rear springs carried by the running-gear and connected to the angled terminals of the transverse strip, a fifth-wheel connected to the forward end of the running-gear, a single wheel connected to the fifth-wheel, means for securing a draft device to the front wheel, a rear axle, and two rear wheels journaled upon the rear axle.

4. In a buggy, the combination of a body, longitudinal strips secured to the bottom and extending nearly the full length thereof, said strips being provided with hooked forward ends, a transverse strip also carried by the bottom of the body and having angled terminals, a running-gear, a forward spring carried by the running-gear and connected to the hooked ends of the longitudinal strips, rear springs carried by the running-gear and connected to the angled terminals of the transverse strips, upper and lower fifth-wheel supports connected to the forward end of the said gear, a frame pivotally mounted between said supports and forming the fifth-wheel, a yoke carried by said frame, an axle carried by said yoke, a front wheel mounted between the yoke upon the axle, and means whereby a draft device is connected to the forward end of the frame.

In testimony whereof I affix my signature in presence of two witnesses.

FRANK EDER.

Witnesses:
T. E. TABER.
HUNTER ALLEN.